Oct. 13, 1964 L. S. SUOZZO 3,152,783
COMBINED MOTORIZED SUPPORT AND SPRING SUPPORT APPARATUS
Filed Jan. 16, 1963 2 Sheets-Sheet 1
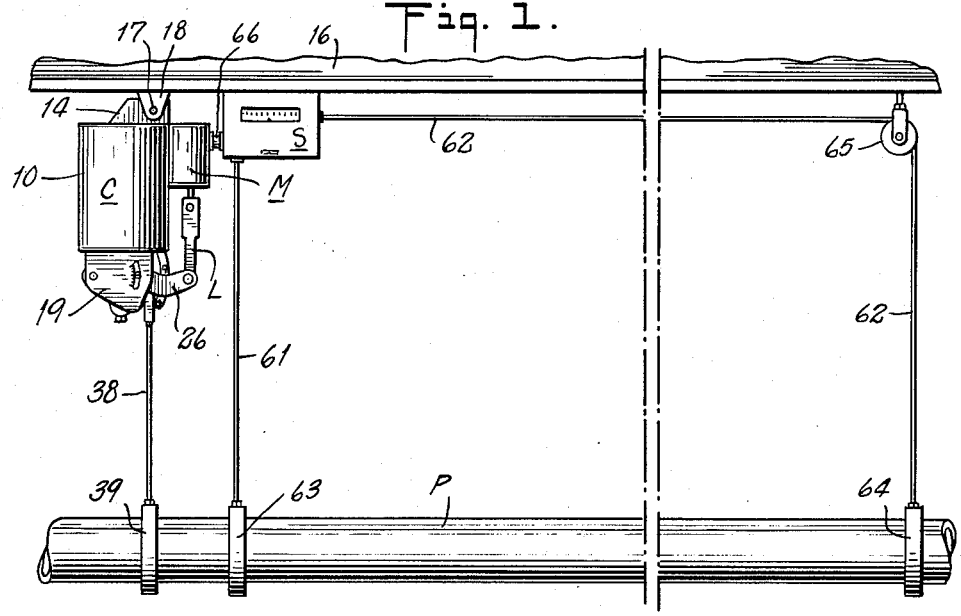
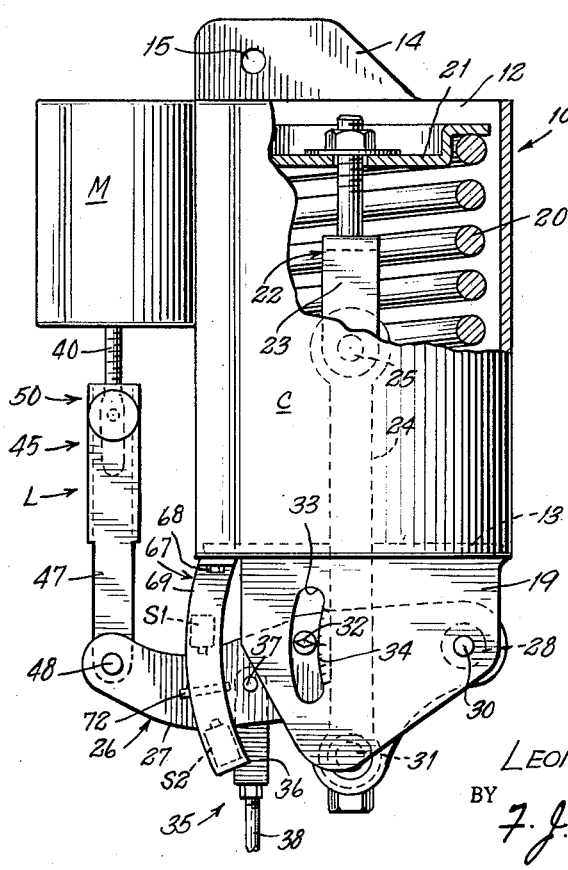
INVENTOR.
LEONARD S. SUOZZO
BY
F. J. Pisarra
ATTORNEY Oct. 13, 1964            L. S. SUOZZO            3,152,783
COMBINED MOTORIZED SUPPORT AND SPRING SUPPORT APPARATUS
Filed Jan. 16, 1963            2 Sheets-Sheet 2
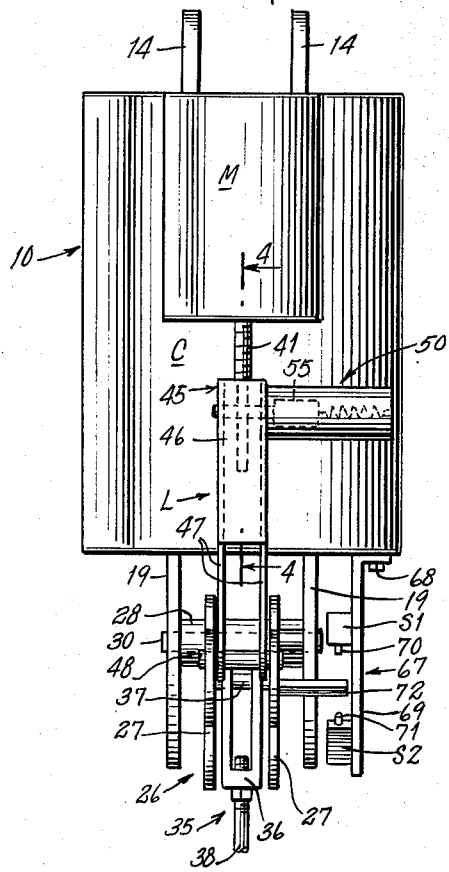
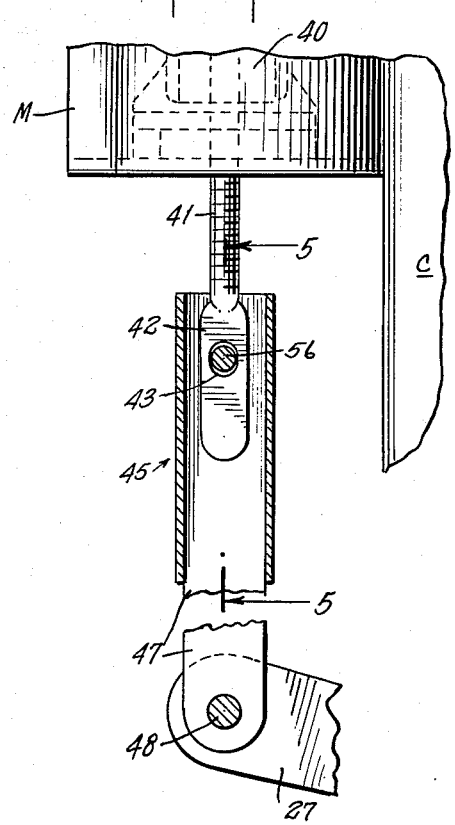
INVENTOR.
LEONARD S. SUOZZO
BY
ATTORNEY

United States Patent Office

3,152,783
Patented Oct. 13, 1964

3,152,783
COMBINED MOTORIZED SUPPORT AND SPRING
SUPPORT APPARATUS
Leonard S. Suozzo, 366 Maple Hill Road,
Hackensack, N.J.
Filed Jan. 16, 1963, Ser. No. 251,959
16 Claims. (Cl. 248—54)

This invention relates to the art of supports and, more particularly, to combined motorized support and spring support apparatus for adequately, dependably and safely supporting a load, such as piping. The invention pertains, in one of its more specific aspects, to an improved arrangement of apparatus combining the usual functions of a motorized support device and a spring support device, the latter being capable of furnishing a constant supporting force within at least part of its operating range.

While the apparatus of this invention is adapted to be advantageously employed with various types of loads, it is especially useful in power plants and other locales to support piping arrangements, which transmit high temperature fluids, and simultaneously permit movement of the piping as the result of expansion or contraction thereof, due to temperature changes in the material of the piping. Accordingly, the ensuing discussion, the accompanying drawings and the detailed description that follows are directed, by way of example, to utilizing the apparatus of this invention with a piping load.

As is well known to the art, a spring support device, whether of the constant or variable type, furnishes a yielding supporting force to a piping load with the selected range of movement of the load. There have been several important advances in this field in recent years. These advances are exemplified by the constructions disclosed in several of my patents, including Patent No. 2,923,507, granted February 2, 1960, and Patent No. 2,939,663, granted June 7, 1960, both of which are entitled "Constant Support Device."

As is also well known, a motorized support device furnishes a positive and non-yielding supporting force to a piping load. Present day motorized support devices include driving means, usually comprising screw jacks and electric motors, which are adapted to be placed into and out of active service and cooperate with other parts to impart a non-yielding supporting force to the load in response to variations in a condition of the load, such as variations in the force exerted by the piping load, variations in the vertical position of an element which is carried by and is movable with the piping, variations in the angular position of at least part of the piping, and variations in the temperature of or pressure in the piping. A recent noteworthy advance in the field of motorized support devices is embodied in the construction disclosed in my Patent No. 3,033,506, granted May 8, 1962, and entitled "Motor-Actuated Suspension Type Support Device."

Motorized support devices afford certain advantages over only spring support devices, which have a constant force range, in many high temperature piping installations. For one thing, a motorized support device is adapted to have its driving means placed alternately into and out of active service in response to variations in one or more of the above-enumerated conditions, as well as other conditions. Also, a motorized support device may be so designed as to not only adequately support the normal weight of the piping but also overcome extraneous forces and conditions, such as friction.

On the other hand, when only a motorized support device is utilized, it may give rise to a potentially highly undesirable situation in the event of power failure, i.e., failure in the supply of electric energy for operating its electric motor and/or associated electrical components. In case of such failure, the motorized support device ceases to automatically adapt itself and the piping to subsequent variations in the selected condition or conditions, and, as a consequence, remains a rigid, unvarying and inflexible support so long as the power failure continues. This may result in costly damage to the piping load and related equipment and create a dangerous hazard to workers.

The apparatus of this invention successfully eliminates the possibility of occurrence of the abovementioned undesirable situation, as will be readily apparent to persons trained in the art from the accompanying drawing taken in conjunction with the detailed description appearing further along herein.

The apparatus of this invention comprises five principal devices or means, namely, a spring support device, a motorized support device, a control means, a coupling means, and a means for operating the coupling means. The spring support device includes a first support means, a spring mechanism carried by the first support means and a lever connected and movable relative to the first support means about a first pivotal axis and connected and movable relative to the spring mechanism about a second pivotal axis. A load-carrying unit is connected and movable relative to the lever about a third pivotal axis. The motorized support device includes a second support means which is affixed to the first support means, a screw member which is carried by and is movable relative to the second support means, and driving means. The driving means includes an electric motor. The control means consists of a known device which is connected to the motorized support device and is adapted to be connected to the load. The control means is adapted to place the driving means into and out of active service in response to variations in one or more selected conditions of the load. The coupling means consists of a linkage which detachably connects the lever to the screw member. This means also includes a movable pin. The means for operating the coupling means is an electric unit, preferably an electric solenoid, which is coupled to the pin and is adapted to move the pin in a manner to effect disconnection of the level from the screw member in the event of power failure.

The primary object of this invention is to provide improved apparatus for adequately, dependably and safely supporting a load, such as piping, and simultaneously permitting requisite movement of the load.

Another object of this invention is to provide apparatus which is adapted to function as an adjustable, rigid, and non-yielding support for piping and the like, or as a resilient and yielding support for the piping, depending on particular conditions encountered in use.

The invention has for a further object the provision of improved support apparatus including an electrically operable motorized support device and a spring support device which are so constructed and arranged that the motorized support device is automatically rendered ineffective in the event of electric power failure.

A still further object of this invention is to provide support apparatus of the character indicated which is relatively simple and compact in design; which is sturdy and durable in construction; which is reasonable in manufacturing, installation and maintenance costs; and which is adapted to perform its intended functions in a satisfactory and trouble-free manner.

The enumerated objects and additional objects, together with the advantages and benefits obtainable by the use of the apparatus of this invention, will be readily understood by persons skilled in the art upon reference to the following detailed description taken in conjunction with the annexed drawings, which respectively describe and illustrate a preferred arrangement of apparatus embodying the invention.

In the drawings, wherein like reference characters denote corresponding parts throughout the several views:

FIG. 1 is a view in front elevation of an arrangement of apparatus constructed in accordance with this invention and operatively associated with a horizontal section of a piping load;

FIG. 2 is an enlarged view of a portion of the apparatus illustrated in FIG. 1, certain parts being broken away and other parts being shown in cross-section for better illustration;

FIG. 3 is a side elevation view as seen from the left of FIG. 2;

FIG. 4 is an enlarged fragmentary view taken along line 4—4 of FIG. 3; and

FIG. 5 is a view taken along line 5—5 of FIG. 4.

Referring initially to FIG. 1, the form of the invention illustrated therein includes several principal entities, including a constant support device C, a motorized support device M and a linkage L. These entities are cooperatively associated with a load, such as a section of piping P of the character referred to earlier herein, and a device S and auxiliary equipment for sensing the position of piping P.

Constant support device C may be of any suitable type known to the art. It is preferably the same as or similar to one of the devices disclosed in my said Patent No. 2,923,507. As is best shown in FIG. 2, the device C comprises a housing 10 consisting of a cylindrical side wall 11, a top wall 12 and a bottom wall 13. The housing is equipped with a pair of spaced, parallel, upper plates 14 which are welded to top wall 12 and which are provided with aligned openings 15. Plates 14 and, therefore, housing 10 are adapted to be pivotally connected to an overhead support, such as a building beam 16, through the medium of a pin 17 (FIG. 1) which registers with openings 15 and corresponding openings (not shown) in a bracket 18 that is affixed to and depends from the beam. Housing 10 is also equipped with a pair of spaced, parallel lower plates 19 which are welded to and project downwardly from bottom wall 13.

Positioned within the housing is a spring mechanism including a helical compression spring 20, which bears at its ends against bottom wall 13 and a movable backing plate 21, and a rod means 22, which is connected to plate 21. The rod means comprises a clevis unit 23 and an eye rod 24 which is pivoted to the clevis by a pin 25 and which extends through an opening (not shown) in bottom wall 13.

Device C also includes a lever 26 which consists of a pair of parallel plates 27 and a hub 28 that is positioned between these plates and is welded thereto to obtain a rigid, unitary, lever construction. The major portion of lever 26 is positioned between plates 19 and is pivotal relative to these plates about the axis of a pin 30 which is carried by the plates and extends through hub 28. Lever 26 is also pivotally connected to rod means 22 by a pin 31 which extends through the opening in eye rod 24. An indicator pin 32 is secured to one of lever plates 27 and registers with an arcuate slot 33 in a corresponding plate 29. The indicator pin cooperates with graduations 34 on plate 19 to denote load travel. The indicator pin also coacts with the portions of plate 19 that define the ends of slot 33 to limit angular movement of the lever relative to plates 19.

A load-carrying unit 35 is secured to and movable with lever 26. This unit comprises a clevis 36 which is pivotally connected to the lever plates by a pin 37 and a rod 38 which is secured to and extends downwardly from the clevis. Rod 38 is connected to piping P by a strap 39.

For further details regarding the construction and operation of device C, reference may be had to said Patent No. 2,923,507.

Motorized support device M comprises a reversible electric motor, gearing and a screw jack, including a screw member, and may be the same as or similar to the support device which is disclosed in my said Patent No. 3,033,506, to which reference may be had for details of construction and operation. In FIG. 4, numeral 40 generally denotes a combined electric motor, gearing and a screw jack, which serve as a driving means for a screw member 41. It is deemed sufficient for the purposes of this application to point out that the driving means is adapted, in operation, to vary the effective length of screw member 41. The screw member has a flattened lower end portion 42 which is provided with a through opening 43 (FIG. 5).

Linkage L constitutes a coupling means which is interposed between lever 26 and screw member 40 and which detachably connects these parts. The linkage includes a housing 45 which is open at its upper and lower ends and which is provided with a removable window or cover 46 to permit ready access to parts positioned therein. Integral with housing 45 is a pair of spaced, parallel, depending legs 47 which are pivotally connected to lever 26 by a pin 48.

Mounted on housing 45, in any desired manner known to the art, is an electric solenoid unit 50 which is best shown in FIG. 5. This unit comprises a casing including a front end wall 51, having an opening 52, and a rear end wall 53. A magnetizing coil 54 is contained in the housing. Slidable in coil 54 is a solenoid core or plunger 55. A latching pin 56 is affixed to an end of plunger 55 and is slidable therewith. Pin 56 normally extends through casing opening 52 and opening 57 in one of the side walls of housing 45. This pin is also adapted to register with opening 43 in screw extension 42 and with an opening 58 in the other side wall of the housing, as indicated in FIG. 5, when coil 54 is energized. A helical tension spring 60 is anchored at its ends to plunger 55 and casing rear wall 53. This spring is adapted to move plunger 55 and pin 56 to the right, whereby to place the pin out of registry with openings 58 and 43 and effect disconnection between housing 45 and screw member 41, when coil 54 is de-energized.

It will be evident from an examination of the drawings, particularly FIGS. 4 and 5, that pin 56 forms a pivotal connection between linkage L and screw member 41 when the parts are in the relative position shown in those views. The diameter of pin 56 is somewhat less than that of openings 43 and 58 to facilitate withdrawal of this pin from those openings and detachment of the linkage from the screw member as required by conditions of use.

Device S cooperates with motorized support device M and with piping P to place the electric motor of device M into and out of active service in response to variations in a condition of the piping. In the illustrated construction, device S is responsive to variations in the angular position of piping P. As is best shown in FIG. 1, device S is operatively connected to the piping through the intermediary of flexible cables 61 and 62 and corresponding pipe straps 63 and 64. Cable 62 rides over a pulley 65 which is suspended from beam 16. Device S is also operatively connected to device M by means of electric conductors 66. Both device S and device M are electrically energized through the medium of a suitable source of electric energy supply (not shown). Device S is preferably the same as the construction disclosed in my pending patent application, Serial No. 150,258, filed November 6, 1961, for "Position Sensing Apparatus" to which reference may be had for details on construction and operation. It is deemed sufficient for the purposes of this application to point out that device S includes electric switch means (not shown) which are actuated in response to variations in the angular position of piping P to alternately place the motor of device M into and out of active service to thereby correspondingly increase or decrease the effective length of screw member 41. As a consequence, the screw member cooperates with linkage L, lever 26 and load-carrying unit 35 to correspondingly raise or lower the left portion of the piping as viewed in FIG. 1.

The illustrated apparatus also includes a bracket 67 which is secured to housing 10 by a screw 68. This bracket includes a depending arcuate arm 69 which carries a pair of spaced electric switches consisting of a first switch $S_1$, having an actuating push button 70, and a second switch $S_2$, having an actuating push button 71. Switches $S_1$ and $S_2$ are connected by electric leads (not shown) to device M and are energized by the same source of electric current as device M and device S. An arm 72 is carried by lever 26 and terminates in the space between push buttons 70 and 71. Switches $S_1$ and $S_2$ are in the nature of limit switches and are operable by arm 72 in response to predetermined pivotal movement of lever 26 in opposite directions.

It will be observed from the foregoing that control of the motor of device M is subject to both device S and switches $S_1$ and $S_2$. If desired, switches $S_1$ and $S_2$ may be omitted or inactivated so that device M is controlled only by device S. Alternatively, device S may be omitted so that device M is controlled only by switches $S_1$ and $S_2$.

For the purpose of outlining the operation of the illustrated form of the invention, it is assumed that the parts are assembled and are in the relative position shown in the drawings. It is also assumed that solenoid unit 50 is energized. With the parts so arranged, device M serves as the support for piping P through linkage L, lever 26, load-carrying unit 35 and strap 39. Operation of device M is controlled by device S and/or switches $S_1$ and $S_2$. In the event of power failure, i.e., interruption of the electric current supply to the various electrical components, solenoid coil 54 becomes deenergized, allowing its plunger 55 and pin 56 to be retracted or moved toward the right by spring 60, as viewed in FIG. 5. This causes pin 56 to be disconnected from extension 42 of the screw member and detaches the screw member from lever 26. As a consequence, device M is rendered ineffective and the piping is supported only by constant support device C. The free end of screw member extension 42 is retained in housing 45. This facilitates re-insertion of pin 56 in openings 43 and 58 when power conditions return to normal.

From the foregoing, it is believed that the construction, operation, objects and advantages of my present invention will be readily comprehended by persons skilled in the art, without further description. It is to be clearly understood, however, that various changes in the construction described above and illustrated in the drawings may be made without departing from the scope of the invention, it being intended that all matter contained in the description or shown in the drawings shall be interpreted as illustrative only and not in a limiting sense.

I claim:

1. In apparatus for use with a load, such as piping, the combination comprising a spring support device including first support means, a spring mechanism carried by the first support means and a lever connected and movable relative to the first support means about a first pivotal axis and connected and movable relative to the spring mechanism about a second pivotal axis; a load-carrying unit connected and movable relative to the lever about a third pivotal axis; a power operated motorized support device including second support means connected to the first support means, a screw member carried by and movable relative to the second support means and driving means connected to the screw member and adapted to vary its effective length; control means connected to the motorized support device and adapted to be connected to the load, said control means being constructed to place the driving means into and out of active service in response to variations in a condition of the load; coupling means detachably connecting the lever to the screw member; and means responsive to power failure for operating the coupling means in a manner to effect disconnection of the lever from the screw member.

2. Apparatus according to claim 1 wherein the spring support device is adapted to furnish a constant force to the load.

3. Apparatus according to claim 1 wherein the driving means includes an electric motor.

4. Apparatus according to claim 1 wherein the control means includes electric switch means.

5. Apparatus according to claim 1 wherein the last-defined means comprises an electric solenoid.

6. Apparatus according to claim 1 wherein the driving means includes an electric motor, the control means includes electric switch means and the last-defined means comprises an electric solenoid.

7. In apparatus for use with a load, such as piping, the combination comprising a spring support device including first support means, a spring mechanism carried by the first support means and a lever connected and movable relative to the first support means about a first pivotal axis and connected and movable relative to the spring mechanism about a second pivotal axis; a load-carrying unit connected and movable relative to the lever about a third pivotal axis; a power operated motorized support device including a second support means connected to the first support means, a screw member carried by and movable relative to the second support means and driving means connected to the screw member and adapted to vary its effective length; control means connected to the motorized support device and adapted to be connected to the load, said control means being constructed to place the driving means into and out of active service in response to variations in a condition of the load; coupling means detachably connecting the lever to the screw member, said coupling means comprising a linkage connected and movable relative to the lever about a fourth pivotal axis and connected and movable relative to the screw member about a fifth pivotal axis; and means responsive to power failure for operating the coupling means in a manner to effect disconnection of the lever from the screw member.

8. Apparatus according to claim 7 wherein said pivotal axes are spaced apart and parallel.

9. Apparatus according to claim 7 wherein one of the connections between the linkage and the lever and the screw member includes a movable pin and wherein the last-defined means is adapted to move the pin in a manner to interrupt said one of the connections.

10. Apparatus according to claim 7 wherein the driving means includes an electric motor.

11. Apparatus according to claim 7 wherein the control means includes electric switch means.

12. Apparatus according to claim 7 wherein the last-defined means comprises an electric solenoid.

13. Apparatus according to claim 7 wherein one of the connections between the linkage and the lever and the screw member includes a movable pin and wherein the last-defined means comprises an electric solenoid, said solenoid being connected to and adapted to move the pin in a manner to interrupt said one of the connections.

14. In apparatus for use with a load, such as piping, the combination comprising a spring support device including first support means, a spring mechanism carried by the first support means and a lever connected and movable relative to the first support means about a first pivotal axis and connected and movable relative to the spring mechanism about a second pivotal axis; a load-carrying unit connected and movable relative to the lever about a third pivotal axis; a power operated motorized support device including second support means connected to the first support means, a screw member carried by and movable relative to the second support means and driving means connected to the screw member and adapted to vary its effective length; control means connected to the motorized support device and adapted to be connected to the load, said control means being constructed to place the driving means into and out of active service in response to variations in a condition of the load; coupling means detachably connecting the lever to the screw member, said coupling means comprising a link, first connector means connecting the link to the lever and permitting relative movement of the link and the lever about a fourth pivotal axis, second connector means connecting the link to the screw member and permitting relative movement of the link and the screw member about a fifth pivotal axis, one of said connector means comprising a movable pin; and means responsive to power failure for moving the pin in a manner to effect disconnection of the lever from the screw member.

15. Apparatus according to claim 14 wherein the last-mentioned means comprises an electric solenoid.

16. Apparatus according to claim 14 wherein the spring support device is adapted to be suspended from and movable relative to an overhead structure about a sixth pivotal axis, and wherein the motorized support device is carried by the spring support device and is movable therewith about said sixth pivotal axis.

No references cited.